United States Patent [19]

Kuroda

[11] Patent Number: 4,509,408
[45] Date of Patent: Apr. 9, 1985

[54] FLUID PRESSURE ACTUATOR

[75] Inventor: Takeshi Kuroda, Kure, Japan

[73] Assignee: Kowa Shoji, Ltd., Tokyo, Japan

[21] Appl. No.: 486,772

[22] Filed: Apr. 20, 1983

[30] Foreign Application Priority Data

Apr. 20, 1982 [JP] Japan .................................. 57-66527

[51] Int. Cl.³ .............................................. F01B 21/00
[52] U.S. Cl. ............................................ 92/2; 92/17;
92/33; 414/749; 901/22
[58] Field of Search ................. 92/68, 71, 31, 33, 749,
92/2, 17; 901/22; 414/4

[56] References Cited

U.S. PATENT DOCUMENTS 2,197,155  4/1940  Nardone ................................. 92/33
3,920,084  11/1975  Russell, Jr. ............................. 92/31

FOREIGN PATENT DOCUMENTS 20970      2/1980   Japan ..................................... 92/33
76705      6/1981   Japan ..................................... 92/33
WO82/04293 12/1982  PCT Int'l Appl. ..................... 92/33
2076469A   12/1981  United Kingdom .................... 92/33
0920280    4/1982   U.S.S.R. ................................. 92/33

Primary Examiner—Sheldon J. Richter
Assistant Examiner—Randolph A. Smith
Attorney, Agent, or Firm—Edwin E. Greigg

[57] ABSTRACT

A piston member is mounted in a cylinder body to be axially movable and unrotatable relative thereto. A ball nut retaining balls is fixed to the piston member, and a screw shaft having a helical groove in engagement with the balls is mounted to be rotatable and axially immovable relative to the cylinder body. The screw shaft makes many rotations when the piston under fluid pressure slightly advances axially inside the cylinder.

4 Claims, 6 Drawing Figures

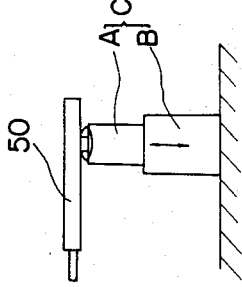
Fig. 4
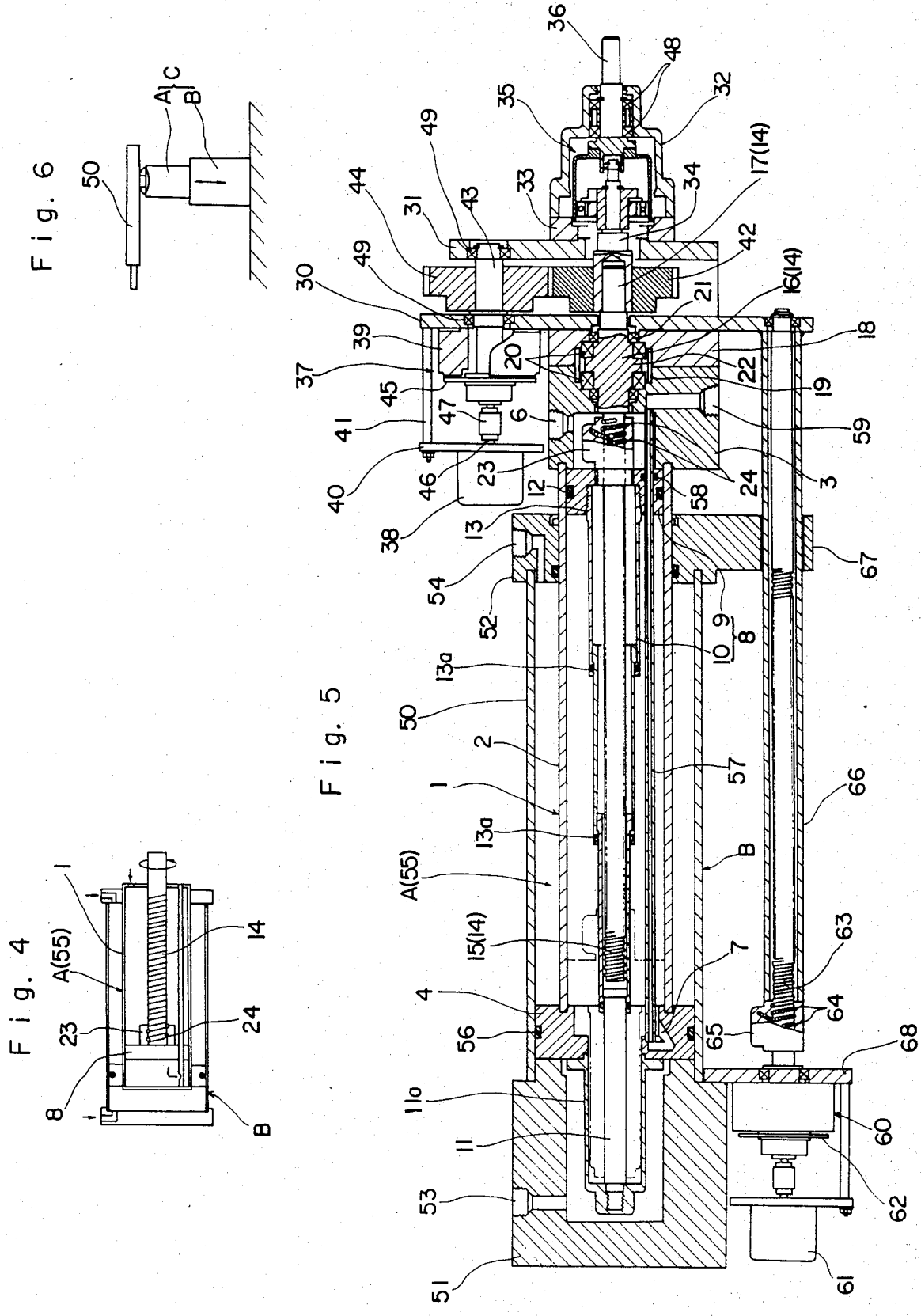
Fig. 6
Fig. 5

FLUID PRESSURE ACTUATOR

BACKGROUND OF THE INVENTION

This invention relates to a fluid pressure actuator and more particularly to a fluid pressure actuator comprising a cylinder containing a shaft rotatable by a fluid pressure, the cylinder per se preferably being adapted to expand and contract.

The fluid pressure actuator according to this invention is operable by hydraulic pressure or pneumatic pressure, and drive for a piston member thereof may be the single-acting type or the double-acting type.

Hydraulic rotary motors are broadly classified into vane system motors and piston system motors. The piston system motors include the rack and pinion type, the helical spline piston type, the piston chain type and the piston link type.

What is the closest to the fluid pressure actuator of this invention is the helical spline type, which has such a construction that, when a hydraulic pressure is applied to slide a piston mounted in a cylinder body, a helical spline slidable in unison with the piston imparts a rotational force on a helical spline in engagement therewith and rigidly attached to a rotary drive shaft. This helical spline piston type allows length of the helical splines to be determined freely and therefore the angle of rotation to be selected as desired. On the other hand, it has problems of requiring a great driving energy, of involving considerable energy losses and of its operation tending to be heavy.

A known actuator providing a rotational movement, and expansion and contraction or linear movements generally utilizes a cylinder to carry out the expansion and contraction. However, it can be said that the cylinder and a rotary part are in a very poor degree of organic combination. Therefore, its entire construction very much tends to be large, heavy and complicated. Such a known actuator also has a problem from a point of view of balance, and often loses smoothness of operation.

SUMMARY OF THE INVENTION

This invention has been made in order to solve the above noted problems.

Therefore, an object of this invention is to provide a fluid pressure actuator comprising a cylinder body, a piston member mounted in the cylinder body to be axially movable and unrotatable relative thereto, a ball nut fixed to the piston member and axially aligned to a direction of movement of the piston member, the ball nut retaining a plurality of balls, and a screw shaft having a helical groove in engagement with the plurality of balls and mounted to be rotatable and axially immovable relative to the cylinder body, the screw shaft acting as a rotary drive shaft.

Another object of this invention is to provide a fluid pressure actuator wherein a fluid pressure rotary motor comprises a tube body, a piston member mounted in the tube body to be axially movable and unrotatable relative thereto, a ball nut fixed to the piston member and axially aligned to a direction of movement of the piston member, the ball nut retaining a plurality of balls, and a screw shaft having a helical groove in engagement with the plurality of balls and mounted to be rotatable and axially immovable relative to the tube body, the fluid pressure rotary motor per se acting as a piston member mounted in a fluid pressure cylinder to be axially slidable relative thereto.

The fluid pressure actuator according to this invention is operable under high precision control. This actuator is controlled with high precision with respect to both axial movements and angle of rotation particularly since a very slight axial movement can be converted at a greatly multiplied ratio into an angular movement.

Other objects and advantages of this invention will be apparent from the following description.

BRIEF DESCRIPTION OF THE DRAWINGS

FIG. 4 is a view showing constructional principle of an actuator according to a second embodiment of this invention, FIG. 5 is a sectional view of the actuator of FIG. 4, and FIG. 6 is a schematic view of the actuator of FIG. 4 as utilized as a manipulator or robotic arm.

DETAILED DESCRIPTION OF THE PREFERRED EMBODIMENTS

Figure 1:
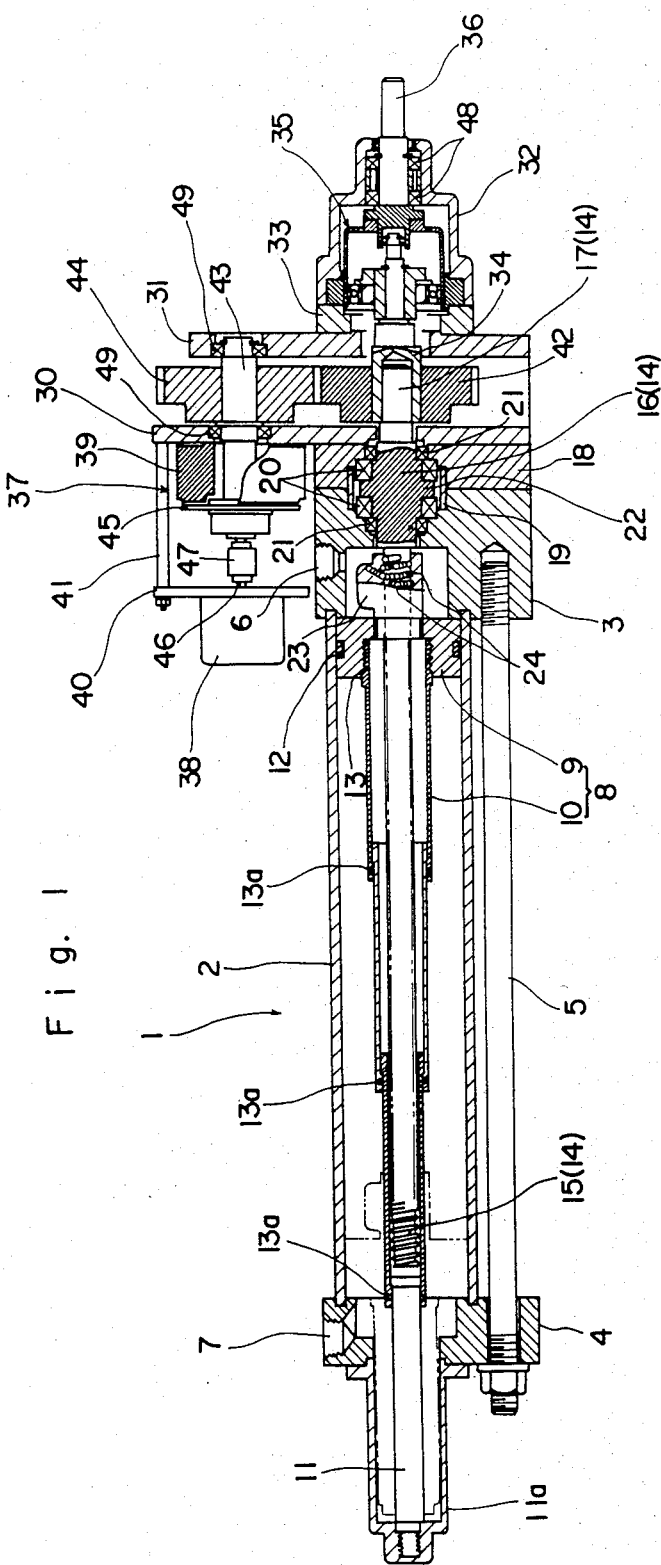
FIG. 1 is a sectional view of an actuator according to a first embodiment of this invention.

First, a description is made of a principle common to the two embodiments shown in FIGS. 1 through 6.

In the actuators according to this invention, a ball nut is fixed to a piston member mounted in a cylinder body to be axially aligned to a direction of movement of the piston member, and a screw shaft in engagement with a plurality of balls retained by the ball nut is mounted to be rotatable and axially immovable relative to the cylinder body, the screw shaft acting as a rotary drive shaft. Thus, the ball screw instead of helical splines acts as converter of movement from linear movement to rotation. The above construction carries out the following excellent operation:

When the piston member is moved by applying or removing a fluid pressure, the balls held by the piston member in engagement with a helical groove of the screw shaft roll along the helical groove. At this time the screw shaft receives stresses on side walls of the helical groove from the rolling balls which advance with the piston member in a linear direction. Since the screw shaft is locked against linear movement, only those components of the stresses which act vertically to the axis effectively work to rotate the screw shaft. The length of the screw shaft can be determined freely and therefore the angle of rotation can be selected as desired.

The angle of rotation $\theta$ of the screw shaft is derived from an equation, $$\theta = 360° \times (L/P) \quad (1)$$

wherein P is a pitch of the helical groove of the screw shaft, and L is an amount of movement of the piston member. Thus the angle of rotation $\theta$ is 360° when L equals P.

An amount of movement X of the piston member corresponding to an angle of resolution power $\phi$ to detect an amount of rotation is derived from an equation, $$X = \phi/360 \times P \quad (2)$$

The pitch P varies with the shaft diameter but, provided that the shaft diameter is the same, pitch P1 of a conventional helical spline is far greater than pitch P2 of the screw shaft according to this invention. Therefore, angle of rotation $\theta2$ is far greater than angle of rotation $\theta1$ as derived from the above equation (1) when the amount of movement L is the same. X2 is far smaller than X1 as derived from the equation (2). It is to be noted that $\theta1$ and X1 represent those which pertains to the prior art and $\theta2$ and X2 to the present invention.

In summary, this invention facilitates precise control for the angle of rotation, and the shaft length may be shorter than in the prior art to obtain the same angle of rotation. Compared with the helical spline, the ball screw is capable of a very smooth movement with a far smaller frictional resistance.

A description will now be made of an actuator according to a first embodiment of this invention with reference to FIG. 1.

A cylinder body 1 comprises a cylinder tube 2, a head cover 3, and a rod cover 4. Number 5 denotes a tie rod, and numbers 6 and 7 denote inlet and outlet ports of a pressure fluid, i.e. oil or air. A piston member 8 comprises a combination of a piston 9 and a telescopic rod 10. The piston member 8 is locked against rotation relative to the cylinder body 1 by suitable means to be described later.

The telescopic rod 10 is the three-stage type and is supported at an extreme end thereof by a core element 11. The core element 11 is supported by an end cover 11a attached to the rod cover 4. Number 12 denotes a piston packing, number 13 denotes a piston gasket, and number 13a denotes seal rings.

A screw shaft 14 has one end thereof supported by the head cover 3 and the other end supported by the telescopic rod 10 and the core element 11. The screw shaft 14 comprises a helically grooved portion 15, a support portion 16 and an output portion 17. Number 18 denotes a press cover, number 19 denotes a screw tube, number 20 denotes bearings and number 21 denotes packings. The support portion 16 includes a flange 22 held between the bearings 20, whereby the screw shaft 14 is locked against sliding movements relative to the cylinder body 1.

A ball nut 23 is screwed to the piston 9 to be coaxial therewith, and retains a plurality of balls 24 in engagement with a helical groove of the screw shaft 14. The balls 24 circulate within the ball nut 23.

The components so far described constitute a principal portion of the actuator. The actuator may be used with a rotation output member attached directly to the output shaft portion 17. The illustrated construction includes other components which are described hereinafter.

A base plate 30 and a forward cover 31 are connected to each other at two sides through flanges, to form a gear box. A retainer 32 is secured to the forward plate 31 across an intermediate plate 33. The base plate 30 is secured to the press cover 18.

An intermediate shaft 34 is splined to the output portion 17 of the screw shaft 14. The intermediate shaft 34 is operatively connected to a final output shaft 36 through a reduction mechanism 35. The final output shaft 36 supports the intermediate shaft 34 to be coaxial and rotatable relative to each other. The reduction mechanism 35 shown is what is called harmonic drive which is compact and yet provides a great reduction ratio and includes no backlash. The harmonic drive itself is known and is therefore not described in detail.

Number 37 denotes an electromagnetic brake, and number 38 denotes a pulse encoder. The electromagnetic brake 37 has a main body 39 secured to the base plate 30. The pulse encoder 38 is secured to a plate 40 which is secured to the base plate 30 through a plurality of tie rods 41. The electromagnetic brake 37 and the pulse encoder 38 have the following input arrangements. The intermediate shaft 34 carries a gear 42 fixed thereto which is in mesh with a gear 44 fixed to a driven shaft 43. The driven shaft 43 carries a magnetic disc 45 to be slidable and unrotatable relative thereto. The main body 39 contains an electromagnetic coil to draw the disc 45. The driven shaft 43 is connected through a flexible coupler 47 to an input shaft 46 of the pulse encoder 38. Numbers 48 and 49 denote bearings.

This actuator operates as follows:

When fluid is introduced through the port 6, the piston 9 and the ball nut 23 move leftward in the drawing and the telescopic rod 10 contracts. This causes rotation of the screw shaft 14 and final output shaft 36 at the same time. On the other hand, the input shaft 46 of the pulse encoder 38 is made to rotate through the gears 42 and 44. An output signal of the pulse encoder 38 is counted by a controller and, when the signal arrives at a predetermined value, the controller gives a control signal to close an electromagnetic valve in a pressure fluid circuit. The electromagnetic brake 37 operates at the same time.

Where the helically grooved portion 15 of the screw shaft 14 has a length of 400 mm with a 5 mm pitch of the helical groove, one stroke of the piston 9 rotates the screw shaft 14 eighty times. One stroke of the piston 9 takes about one second. Where the reduction mechanism 35 gives a reduction ratio of 80, one stroke of the piston 9 causes only one rotation of the final output shaft 36, but the final output shaft 36 has a very large torque.

Where the gears 42 and 44 have an equal gear ratio, the input shaft 46 of the pulse encoder 38 rotates 80 times with one rotation of the final output shaft 36. That is to say one rotation of the input shaft 46 corresponds to 1/80 rotation of the final output shaft 36. If the pulse encoder has a 10° resolution power $\phi$, the degree of precision in controlling the angle of rotation of the final output shaft 36 is derived from an equation, $$360° \times (1/80) \times (10/360) = \frac{1}{8} = 0.125°$$

Thus, if $\phi = 1$, the degree of precision is 0.0125°. It will be seen that the control is provided with a very high degree of precision.

Figure 2:
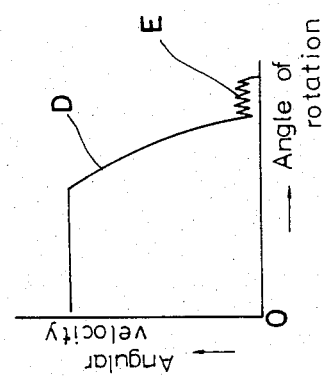
FIG. 2 is a graph showing operational characteristics of the actuator of FIG. 1.

A microcomputer should preferably be used as the controller to which the pulse encoder 38 is connected. In this instance, the electromagnetic brake 37 may be used for reduction D and inching E as shown in FIG. 2. When an overshoot occurs in inching, an adjustment may preferably be effected by reversing a fluid pressure input direction by cooperation of the electromagnetic valve in the fluid circuit.

Figure 3:
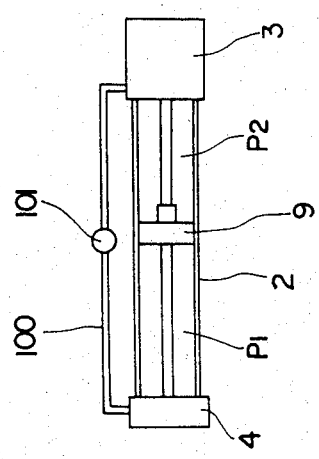
FIG. 3 is a schematic view of a pressure fluid system of the actuator of FIG. 1.

In order to prevent the piston 9 from dashing upon release of the brake, the actuator may be provided with a pressure equalizing mechanism as shown in FIG. 3. This mechanism comprises a bypass 100 and a differential valve 101 which is operated on and off to make a pressure P1 and a pressure P2 substantially equal.

In the embodiment of FIG. 1, the piston 9 is connected with the telescopic rod 10 instead of a piston rod, which has the following advantages. A piston rod would require a sealing structure at a perforation in the rod cover 4. Moreover, a space must be provided to offer allowance when the piston rod is in an extreme protruding position. The telescopic rod does not involve such inconveniences but provides for compactness of the construction.

Furthermore, since the harmonic drive type reduction mechanism is used, a great reduction ratio, a great torque and an ultra-slow rotation are provided, and a backlash is not required.

The described embodiment may be modified in the following manners (not shown in the drawings):
  (a) Means to lock the piston member 8 against rotation relative to the cylinder body 1
    (i) A rod penetrating the piston 9 is mounted in the cylinder body 1.
    (ii) The telescopic rod 10 and the rod cover 4 or the core element 11 have non-circular cross sections.
    (iii) The piston 9 and the tube 2 have non-circular cross sections.
  (b) Means to attach the ball nut 23 to the piston member 8
    (i) The piston member 8 and the ball nut 23 have axes parallel to each other but out of alignment.
    (ii) The ball nut 23 is attached to the telescopic rod 10.
  (c) An ordinary piston rod is used instead of the telescopic rod.
  (d) Any means other than the pulse encoder 38 may be used to detect angles of rotation.
  (e) The controller receiving output of the angle of rotation detector may have a varied object.
  (f) The electromagnetic brake 37 may be replaced by any other type of brake. The brake may be dispensed with.
  (g) The reduction mechanism 35 may have a varied construction or may be dispensed with.

A further embodiment of this invention will be described with reference to FIGS. 4 through 6. This actuator has a composite construction. More particularly, the fluid pressure actuator A according to the first embodiment already described acts as a piston member 55 in this embodiment which is mounted in a cylinder B to be axially movable relative thereto. Therefore, the actuator A has already been described, and the cylinder B will be described hereinafter.

Number 50 denotes a cylinder tube, number 51 denotes a head cover, number 52 denotes a rod cover, and numbers 53 and 54 denote inlet and outlet ports of pressure fluid, i.e. oil or air. The actuator A constitutes the piston member 55 of the cylinder B as mentioned above. The principal portion of this piston member comprises the end cover 4 acting as a piston and the tube 2 acting as a piston rod. The tubes 50 and 2 are coaxial with each other. Number 56 denotes a piston packing. Number 57 denotes a pressure fluid feed pipe extending between the end covers 3 and 4 and through the piston 9. The pistond 9 is slidable relative to the pipe 57. Number 58 denotes a seal ring. The piston 9 is held unrotatable by the pipe 57. Therefore the ball nut 23 also is held unrotatable thereby ensuring rotation of the screw shaft 14. The pipe 56 communicates with an inlet and outlet port 59. The port 7 has a U-turn form as shown.

Number 60 denotes an electromagnetic brake, and number 61 denotes a pulse encoder. The brake 60 has a magnetic disc 62 and the pulse encoder 61 has an input shaft, both connected to a screw shaft 63. The screw shaft 63 is in engagement by means of a plurality of balls 64 with a ball nut 65 which is secured to an end of a tube 66. The tube 66 is slidably supported by a projecting portion 67 of the rod cover 52 and is secured to the base plate 30. The brake 60 and the pulse encoder 61 are attached to a base plate 68 which is attached to the head cover 51. The brake 60 and the pulse encoder 61 have the same constructions as the brake 37 and the pulse encoder 38 described earlier, and their description is omitted.

How the actuator A operates has already been described and is not necessary to repeat it.

The cylinder B merely expands and contracts and therefore its operation need not particularly be described. However, it should be noted that a slight axial movement of the fluid pressure actuator A which constitutes the piston member 55 of the cylinder B is converted at a greatly multiplied rate into an angle of rotation of the screw shaft 63 and that high precision signals are provided by the pulse encoder 61. Therefore, the slight axial movement is accurately controlled.

A combined operation of the actuator A and the cylinder B comprises the following four different modes:
  (I) The actuator A alone operates, which is a rotation in either of two different, i.e. left and right, directions (i) (ii).
  (II) The cylinder B alone operates, which comprises expansion (i) and contraction (ii).
  (III) Combinations in four ways of the above actions.
  (IV) Both stand still.

These operational modes are categorically shown in the table below:

|  |  | Actuator A | | |
| --- | --- | --- | --- | --- |
|  |  | left | right | still |
| Cylinder B | expansion | III | III | II-i |
|  | contraction | III | III | II-ii |
|  | still | I-ii | I-i | IV |

FIG. 6 shows the composite actuator capable of expansion, contraction and swivelling as applied to a robotic arm 70 which is one example of application.

As will be understood from the foregoing description, this invention provides actuators whose rotations are controlled with high precision and which operate smoothly, whereby driving energy therefor may be saved. The invention achieves compactness of construction also.

We claim:

1. A fluid pressure actuator comprising, a cylinder body (1) a telescopic rod (10) disposed in a cylinder tube (2) of the body (1):

a piston (9) disposed in the tube (2) and secured to one end of the rod (10);

a screw shaft (14) disposed in and extending through the rod (10) and having a helically grooved portion (15), a support portion (16) and an output portion (17);

a final output shaft (36) and rotation signal generator means (38) both connected to the output portion (17);

a ball nut (23) having balls (24), said balls engaging with a helical groove of the grooved portion (15) and said ball nut secured to the piston (9);

a rod cover (4) secured to the other end of the telescopic rod (10) and also to one end of the cylinder tube (2);

a head cover (3) secured to the other end of the tube (2) and supporting the support portion (16);

a pipe (57) extending between the head cover (3) and the rod cover (4) and passing through the piston (9);

a further cylinder tube (50) coaxial with and enclosing the tube (2), the further tube (50) having a further head cover (51) and adapted to support the rod cover (4) slidable within said further tube (50);

a still further tube (66) disposed in parallel to and outside the further tube (50), and still further tube (66) having one end secured to the head cover (3), and the other end secured to the further head cover (51);

a further screw shaft (63) rotatably disposed in the still further tube (66) and engaging with a further ball nut (65) by means of a further plurality of balls (64), the ball nut (65) secured to an end of said tube (66);

further rotation signal generator means (61) operatively connected to the further screw shaft (63);

inlet and outlet ports (6), (7), of a pressure fluid said ports allowing communication between said pressure fluid and said tube providing means for driving the piston (9) in an axial direction; and further inlet and outlet ports (53) and (54) of the pressure fluid said further ports allowing communication between said pressure fluid and said further tube providing means for driving the rod cover (4) in an axial direction.

2. An actuator as defined in claim 1, wherein the final output shaft (36) is connected to the output portion (17) by means of a reduction mechanism (35), and said output portion (17) is provided with a brake (37).

3. An actuator as defined in claim 2, wherein the further screw shaft (63) is provided with a further brake (60).

4. An actuator as defined in claim 3, wherein the rotation signal generator means (38), and the further rotational signal generator means (61) are pulse encoders.

* * * * *